No. 885,683. PATENTED APR. 21, 1908.
C. G. ARMSTRONG.
HEATING DEVICE.
APPLICATION FILED MAR. 8, 1902.
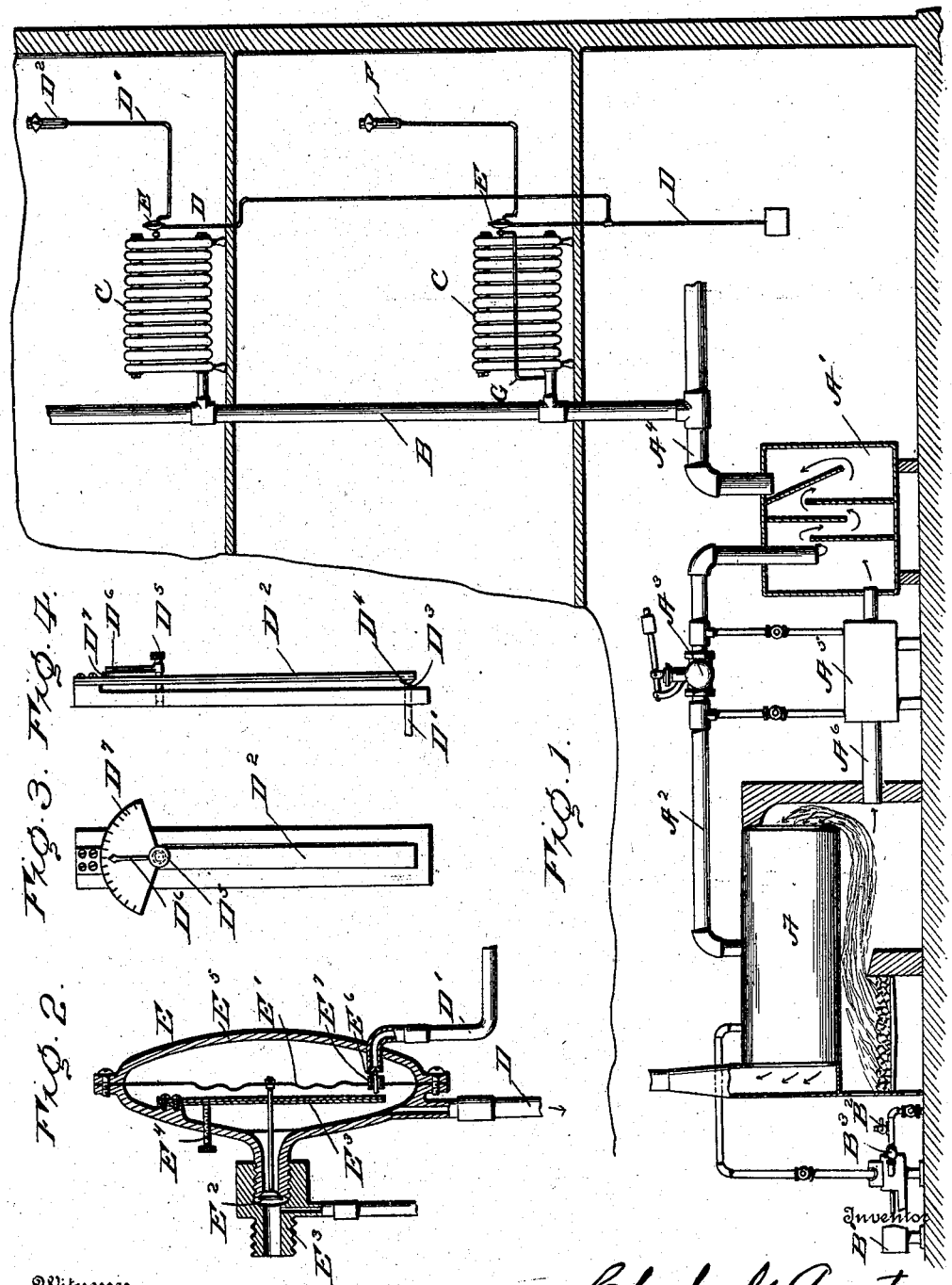
Witnesses
Charles G. Armstrong
By Parker & Carter
Attorneys

UNITED STATES PATENT OFFICE.

CHARLES G. ARMSTRONG, OF CHICAGO, ILLINOIS, ASSIGNOR TO AUTOMATIC HEATING COMPANY, OF JERSEY CITY, NEW JERSEY, A CORPORATION OF NEW JERSEY.

HEATING DEVICE.

No. 885,683.     Specification of Letters Patent.     Patented April 21, 1908.

Application filed March 8, 1902. Serial No. 97,297.

*To all whom it may concern:*

Be it known that I, CHARLES G. ARMSTRONG, a citizen of the United States, residing at Chicago, in the county of Cook and State of Illinois, have invented a certain new and useful Improvement in Heating Devices, of which the following is a specification.

My invention relates to systems and devices for regulating the heating of apartments, etc., and has for its object to provide a new and improved apparatus for this purpose.

My invention is illustrated in the accompanying drawings, wherein:

Figure 1 is a diagrammatic view, showing one form of apparatus embodying my invention; Fig. 2 is a detail view showing one form of valve associated with the thermostat; Figs. 3 and 4 are views of one form of thermostat used in connection with my present system.

Like letters refer to like parts throughout the several figures.

In heating apartments in buildings and the like, it is necessary to provide a heater of such capacity as to produce the desired temperature during the coldest weather experienced. As the radiating capacity of the heater to produce the desired temperature during the greater part of the heating season is much smaller than the maximum heating capacity, it is desirable, in order satisfactorily and efficiently to heat the buildings, to arrange some means for controlling the heat supply in accordance with the variations of the external atmosphere. By means of my present device, this result may be satisfactorily obtained and the heat given out by the heater may be controlled so as to secure the desired temperature in the apartment at all times during the heating season. If, for example, my device is used in connection with steam heating, 1 mix or associate with the water used or with the steam, before it enters the heater, some fluid or gas which is non-condensing at ordinary temperatures and pressures, such as air or the like, and this mixture or combination of steam and other gas is then permitted to flow into the heater. The steam or vapor in the heater gradually condenses and is replaced by more of the mixture. The non-condensing gas of whatever nature thus gradually accumulates in the heater and displaces the heating fluid, thus gradually as it were reëliminating a part of the heater, or in other words, gradually reducing the effective radiating capacity of such heater. A suitable means is provided for partially or wholly withdrawing this displacing fluid when desired, to prevent a too great lowering of the temperature in the apartment to be heated.

It is of course evident that many different arrangements may be provided for carrying out my invention, and for purposes of illustration I have selected the diagrammatic representation of the drawings.

In Fig. 1, for example, I have illustrated the source of steam supply as the boiler A, said boiler being connected by suitable connections with a riser B, to which are connected the heaters C. Suitable means are provided for introducing into the system a gas non-condensing at ordinary temperatures and pressures, such for example as air, and which acts as a displacing fluid in the heaters to displace the steam or other heating fluid, so as to reduce the effective heating area of such heaters. This non-condensing gas may therefore be termed a displacing gas or fluid, and such displacing fluid may be introduced into the boiler with the water or may be introduced at some other point so as to mix with the steam after it has been formed.

In Fig. 1, I have shown a pump B' for pumping water into the boiler A. The air or other displacing fluid may be mixed with this water and inserted with it into the boiler, and to facilitate this I may associate with the pump an air admission cock or valve $B^2$ arranged so that any quantity of air may be drawn in with the water, the quantity being regulated by the valve. When this valve is used, I prefer also to use a check valve $B^3$. If, for example, the air is to be inserted after the steam is formed, I may provide a suitable mixing receptacle, A', in which the heating fluid and the displacing fluid are mixed or associated together. This mixing receptacle is preferably interposed between the boiler A and the riser B, although its location may be varied and will depend upon the conditions met. As herein illustrated, the boiler is connected to the mixing receptacle by the pipe $A^2$, which contains a reduction pressure valve $A^3$, which may be of any desired form, such for example as are now on the market. A pipe $A^4$ leads from the mixing receptacle to the riser B. A suitable displacing fluid pump or fluid moving device A⁵ may be used to facilitate the introduction of the displacing fluid into the mixer. If, for example, this displacing fluid is air, I may provide a suitable means for raising the temperature of the air before it is mixed with the steam. As herein shown, this result is obtained by drawing a supply of more or less heated air from around the boiler, A, by means of the pipe, A⁶. In order to facilitate the mixing of the displacing fluid and the heating fluid, I may provide the mixing receptacle with a series of baffle-plates or other devices for this purpose.

It is evident that my invention may be applied to low or high pressure systems and to any of the heating systems now in use, and that it may be easily and readily adapted to the conditions presented.

The quantity of displacing fluid used can be varied as the temperature of the outside atmosphere varies, so as to aid in securing a proper control, and this may be done either manually or automatically. The quantity of this displacing fluid may be varied automatically by means of a thermostat, or other responsive device, located for example where it is affected by the temperature of the exterior atmosphere. This automatic regulation may be produced by regulating the amount of air forced in by the pump A⁵. Any of the automatic regulating devices for this purpose now on the market may be used. If a thermostat is used, it will control and regulate the amount of displacing fluid in accordance with the temperature of the outside atmosphere, for, if the temperature is low, less displacing fluid will be needed than if the temperature is high. It is also evident that this regulating may be done with the hand or by some other means than automatic means, as for example by retarding the pump A⁵ or limiting the amount of air inserted in the boiler or by reducing the capacity of the air pump, etc.

The mixture of steam and displacing fluid is made to pass along the riser B and into the heater C by any desired agency. Associated with each heater is a suitable exhaust pipe D, which leads to a suction or exhaust device or which is arranged so that the displacing fluid in the heater may be exhausted or decreased in amount by a hand device or by an automatic device. If the latter device is used, it is preferably responsive to variations in the temperature of the apartment to be heated. I have illustrated such a device at E. When such a device is used, it is arranged so that, when the temperature in the apartment falls below a predetermined amount, it will operate to connect the heater with the escape, exhaust or suction device, and it is also arranged so that it will break this connection before all of the displacing fluid has escaped or been withdrawn. This result may be produced in any desired manner.

In the drawing, I have shown one simple and cheap means for accomplishing this result, which may be readily applied to any system. In this construction I use a controlling device E and a device F responsive to variations in the temperature of the apartment to be heated. These two devices may be associated together or may be arranged or disposed in any desired manner and in accordance with the conditions presented. As shown in the drawing, I have placed the controlling device E in proximity to the heater. This controlling device consists of a suitable casing, adapted to be connected with the heater and containing a diaphragm E'. Associated or connected with this diaphragm is a suitable valve E². The diaphragm E' divides the casing into two chambers and normally stands in a central or middle position, as indicated in full lines in Fig. 2. Located on one side of the diaphragm and on the side communicating with the heater is a thermostatic device E³ of any suitable construction. An adjusting device or screw E⁴ is associated therewith, so that the position of the thermostatic device may be controlled. The casing E⁵ of the controlling device is connected to the escape pipe D, such connection being preferably with the section of the casing containing the thermostatic device. On the other side of the diaphragm, the casing is provided with a connection D', which leads to a source of air supply. In this instance, this connection D' leads to the thermostat D². The diaphragm E' is perforated, and such perforation is provided with a movable part or pin E⁶, which is smaller than the opening and which controls the connection D'. This pin or movable part is actuated by the thermostatic device E³, and is preferably contained within a tube E⁷ of somewhat larger cross sectional area. When the controlling device is mounted upon the heater, the parts may be arranged so that it will be far enough from the heater not to be materially affected by the heat thereof. Any suitable means may be provided for preventing this, as for example by connecting it by a non-heat-conducting bushing E⁸ or by placing a shield between the controlling device and the heater. When an ordinary steam radiator is used, it is found that when the controlling device is placed at the side, as indicated, it will not be unduly affected by the heat, because the cold air from below is continually moving toward the radiator and the heated air rising. In some instances, I may provide a connection G, which leads from the portion of the heater containing the steam or from the connecting pipe, and which discharges in proximity to the controlling device or the thermostatic device E³. As shown in Fig. 1, for example, the discharge end of the connecting pipe G is in proximity to the valve E², but between it and the heater, so that when the valve is closed no steam can enter the controlling device.

As shown in Figs. 3 and 4, the connection or pipe D' is open at the end D³, and this open end is controlled by the device responsive to variations in the temperature of the apartment. In the present instance, this device is the thermostat D² of any ordinary construction, and is provided with a closing part D⁴ which engages the end of the pipe D' so as to close it when the temperature of the apartment is normal or is below normal. When the temperature rises above the normal, this thermostat moves to open the end of the pipe D'. In the present instance, I have shown the connection or pipe D' communicating with the atmosphere, but it is of course evident that it might be connected with a source of air supply under pressure if desired, the thermostat controlling this connection.

I have described in detail one form of mechanism for carrying out my invention, but it is evident of course that many other constructions may be used, and that my invention may be carried into operation in various ways and by various agencies. I therefore do not limit myself in any particular to the mechanism or apparatus which I have here illustrated.

The thermostat D² is provided with some suitable regulating device, so that it may be varied to act under different temperatures. Any suitable means for this purpose may be used, and I have shown a screw D⁵ which passes through it and engages the support. This screw is preferably provided with a pointer D⁶ passing over a suitable scale D⁷. By rotating the screw D⁵, the thermostat may be moved in or out so as to change the temperature at which it opens the pipe D'.

The use and operation of my invention are as follows: When the heating system is in use, the heating fluid and associated or mixed displacing fluid pass together through the same opening into the heater. The heating fluid gradually condenses, and the displacing fluid accumulates in the heater, gradually reducing the space free to be occupied by the heating fluid, thus reducing the effective radiating area. The speed of this process can of course be regulated as desired, and will depend upon the conditions presented. When the effective radiating area of the heater has been reduced by the accumulation of the displacing fluid, so that the temperature of the apartment to be heated falls below a predetermined amount, a portion of the displacing fluid is removed. If an automatic device for this purpose is used, it is automatically set in operation when the temperature of the apartment falls below a predetermined amount, and a portion of the accumulated displacing fluid is withdrawn or allowed to escape. The escape is then shut off or closed, and, if not enough has been removed, the device in a short time will be again moved to a position to permit more of the fluid to escape or be withdrawn. The amount of fluid thus taken from the heater at a given time may of course be varied and may be readily regulated as desired. As the displacing fluid is removed from the heater, more space for the steam is secured, and the effective radiating capacity is increased. When this effective radiating area is increased so as to produce the desired temperature, the action of the withdrawing device ceases, and the effective radiating area is then gradually reduced by the accumulation of the displacing fluid. When, for example, the particular controlling device illustrated in the drawings is used, the action is as follows: The mixed heating fluid and displacing fluid is inserted into the heater through the same opening, and the displacing fluid gradually accumulates so as to reduce the effective heating area of the heater. If now the area occupied by the heating fluid becomes too small to keep the temperature of the apartment at the predetermined point, such temperature falls, and the thermostat D² moves away from the pipe D', thus permitting said pipe to connect with the air. Since the pipe D is connected with a pump or other withdrawing means or device, the air will pass through the pipe D' and enter the casing E⁵, moving the pin E⁶ so as to permit its entrance. This movement of the pin is possible because the thermostatic device E³ is now comparatively cool. The air rushing into the casing E⁵ exerts a pressure on the diaphragm E' and moves it so as to move the valve E² from its seat. The withdrawing device is now connected with the heater and withdraws some of the accumulated displacing fluid. In order to prevent the withdrawal of too much of this displacing fluid, I provide means for checking the action of the withdrawing device.

In the ordinary radiator, the steam passes rapidly along the bottom without passing up through all the coils, and hence, since the valve E² is open, the suction immediately draws some portion of this steam into the casing E⁵. This steam then strikes the thermostatic device E³, which is made comparatively sensitive at such temperatures, and it at once moves toward the diaphragm so as to force the pin E⁶ upon its seat, thus preventing any further entrance of the air through the pipe D'. The suction device now draws the air from the section of the casing E⁵ on the right of the diaphragm through the opening in which the pin E⁶ rests, so as to relieve the pressure and practically equalize the pressure on each side of the diaphragm. Such diaphragm then straightens and assumes its middle position, drawing the valve E² closed so as to disconnect the withdrawing device from the heater. The admission of the steam or vapor or heated fluid is then cut off, and the thermostatic device immediately cools so as to release the pin E⁶. If now the thermostat on the wall has not moved back, and the pipe D' is still open, showing that the temperature of the apartment is still too low, the air will again rush in and the action hereinbefore described be repeated. This process will continue until the thermostat closes the pipe D'. The effective area of the opening in the diaphragm not filled by the pin E⁶, that is, the opening through which air is withdrawn from that side of the casing into which D' empties, is smaller than the opening in the pipe D', so that the diaphragm E' will have a pressure exerted on it to move it whenever the mouth of the pipe D' is open. It will thus be seen that, even if the pipe D is continuously connected with the withdrawing device, the controlling device will operate satisfactorily and efficiently.

If the pipe G is used, it will be seen that, since it is connected directly with the device containing steam, the steam will immediately pass into the casing E⁵ as soon as the valve E² is open, and I may use this pipe G in the event the heaters are so constructed that the fluid entering the casing E⁵ does not cause the thermostatic device E³ to act with sufficient speed, for in such event this device may be made to act as quickly as desired by simply varying the size of the pipe G or the amount of material that may pass therethrough.

It will thus be seen that I have here a device by means of which the effective heating area of the heater may be readily controlled, so as to secure the desired temperature in the apartment to be heated.

The process herein set out is not claimed in the present application for the reason that it forms the subject matter of a separate application filed March 4, 1902, Serial No. 96,578, entitled process of regulating heating systems.

What I claim is:—

1. A regulating heating device comprising a source of supply of heating fluid, a heater, a connection between the source of supply and the heater, means for admitting air to the heater through the supply pipe, said heater arranged so as to confine the air therein, and cause it to displace steam, and means independent of the introducing means for withdrawing in part or in whole the air in the radiator.

2. A heating device comprising a heater and a steam generator connected together, means for mixing a non-condensing gas with the steam, this mixture being inserted into the heater so that the non-condensing gas will accumulate in the heater as the steam gradually condenses so as to decrease the effective radiating area, a withdrawing device for withdrawing a portion of said non-condensing gas, said withdrawing device responsive to variations in temperature of the apartment to be heated.

3. A heating device comprising a heater and a steam generator connected together, means for mixing a non-condensing gas with the steam, this mixture being inserted into the heater so that the non-condensing gas will accumulate in the heater as the steam gradually condenses so as to decrease the effective radiating area, a withdrawing device for withdrawing a portion of said non-condensing gas, a controlling device for said withdrawing device responsive to variations in temperature of the apartment to be heated.

4. A heating device comprising a source of supply of heating fluid, one or more heaters and means for mixing a noncondensing gas with the heating fluid before being inserted into the heater, means for confining the non-condensing gas in the radiator, and a device for partially or wholly withdrawing it, said device independent of the means for introducing said non-condensing gas into the heater.

5. A heating system comprising a source of supply of heating fluid, means for mixing a noncondensing gas with the heating fluid and then inserting such mixture in the heater, and a device responsive to variations in temperature of the apartment to be heated for withdrawing a portion of said noncondensing gas from the heater when the temperature of the apartment falls below a predetermined point.

CHARLES G. ARMSTRONG.

Witnesses:
EDWARD CARROLL, Jr.,
AMOS G. RUSSELL.